(12) United States Patent
Lowder

(10) Patent No.: US 12,457,995 B2
(45) Date of Patent: Nov. 4, 2025

(54) BUOYANT AND WATERPROOF PET ACCESSORIES

(71) Applicant: Leah Lowder, Albemarle, NC (US)

(72) Inventor: Leah Lowder, Albemarle, NC (US)

( * ) Notice: Subject to any disclaimer, the term of this patent is extended or adjusted under 35 U.S.C. 154(b) by 143 days.

(21) Appl. No.: 18/532,788

(22) Filed: Dec. 7, 2023

(65) Prior Publication Data
US 2024/0188539 A1 Jun. 13, 2024

Related U.S. Application Data

(60) Provisional application No. 63/431,074, filed on Dec. 8, 2022.

(51) Int. Cl.
*A01K 27/00* (2006.01)
*A01K 29/00* (2006.01)

(52) U.S. Cl.
CPC ............ *A01K 29/00* (2013.01); *A01K 27/001* (2013.01); *A01K 27/002* (2013.01); *A01K 27/003* (2013.01)

(58) Field of Classification Search
CPC .... A01K 27/00; A01K 27/001; A01K 27/002; A01K 27/003; A01K 27/008
See application file for complete search history.

(56) References Cited

U.S. PATENT DOCUMENTS

| | | | | |
|---|---|---|---|---|
| 4,424,043 A | * | 1/1984 | Behl | B63B 34/52 441/88 |
| 6,397,783 B1 | * | 6/2002 | Koch | A01K 27/00 119/856 |
| 2003/0037735 A1 | * | 2/2003 | Albers | A61D 9/00 119/863 |
| 2003/0177984 A1 | * | 9/2003 | Newman | A01K 15/027 119/850 |
| 2003/0220031 A1 | * | 11/2003 | McCormick | A01K 27/002 441/88 |
| 2005/0272327 A1 | * | 12/2005 | Peters | A01K 27/006 441/88 |
| 2008/0035076 A1 | * | 2/2008 | Waterfield | A63B 31/00 119/856 |
| 2013/0323990 A1 | * | 12/2013 | Justice | A63B 21/0084 441/88 |

FOREIGN PATENT DOCUMENTS

| | | | | | |
|---|---|---|---|---|---|
| GB | 267270 A | * | 3/1927 | | B63C 9/08 |
| GB | 2259479 A | * | 3/1993 | | B63B 34/50 |

* cited by examiner

*Primary Examiner* — Kristen C Hayes
(74) *Attorney, Agent, or Firm* — Ashley D. Johnson; Dogwood Patent and Trademark Law

(57) ABSTRACT

The invention is directed to a pet collar, leash, and/or other accessory that is both waterproof and buoyant. Advantageously, the disclosed products include a core layer comprising a buoyant material (such as polypropylene) that allow the products to float when at least partially immersed in water. As a result, the product can be easily retained when inadvertently dropped in a body of water. The products provide the additional advantage of helping a pet remain buoyant when swimming while the collar and/or leash are attached.

15 Claims, 7 Drawing Sheets

BUOYANT AND WATERPROOF PET ACCESSORIES

CROSS-REFERENCE TO RELATED APPLICATIONS

This application claims priority to U.S. Provisional Patent Application No. 63/431,074, filed Dec. 8, 2023, the entire content of which is hereby incorporated by reference.

TECHNICAL FIELD

The presently disclosed subject matter is generally directed to a variety of pet products (e.g., leashes, collars) that are both waterproof and buoyant when exposed to a body of water.

BACKGROUND

Pet owners enjoy walking their pets (especially their dogs) on a daily basis to provide the animal with exercise and the option to explore the surrounding environment. Pet owners typically use a collar that fits around the neck of the animal and can include identification tags or other embellishments. A leash typically releasably attaches to a clip or other attachment mechanism present on the collar, allowing the owner to guide and maintain control of the pet. However, the materials used to construct conventional collars and leashes include heavy materials that sink when immersed in a body of water. As a result, the leash or collar can be easily lost or misplaced in marine environments. Also, serious incidents can occur when a submerged leash hooks on an underwater obstruction, i.e., a submerged log, a reef, or a part of a watercraft. It would be advantageous to provide a collar, leash, or other pet accessory that is buoyant and/or waterproof to retain the device for retrieval by the owner, thereby preventing littering in bodies of water, the ocean, etc. It would be further beneficial if the pet accessory provided a buoyant characteristic to assist the animal when swimming in a body of water.

SUMMARY

In some embodiments, the presently disclosed subject matter is directed to a pet accessory comprising a core layer comprising one or more buoyant materials (e.g., at least/no more than about 50, 55, 60, 65, 70, 75, 80, 85, 90, 95, 99, 99.9, or 100 weight percent of the core layer can include the buoyant material(s)). The pet accessory further includes an exterior layer comprising a durable material, selected from one or more of polyester, polypropylene, high density polyethylene, high impact polystyrene, styrene block copolymer, polyamide, aliphatic polyamide, polymeric material, polyurethane, cloth, plastic, nylon, metal, cyclic olefin copolymer. The accessory optionally includes one or more intermediate layers positioned between the core layer and the exterior layer. Advantageously, the pet accessory is buoyant if immersed in a fluid (e.g., water, seawater, pond water, lake water, swamp water, swimming pool water, etc.).

In some embodiments, the pet accessory is configured as a leash, harness, or collar.

In some embodiments, the pet accessory is about 100% waterproof (e.g., at least about 50, 55, 60, 65, 70, 75, 80, 85, 90, 95, 99, or 100% waterproof).

In some embodiments, the buoyant material is selected from one or more of polypropylene, cork, foam, air, rubber, or gel.

In some embodiments, the buoyant material is selected from one or more recycled materials, sustainable materials, or combinations thereof.

"Recycled materials" refers to waste products which have been treated or processed so as to make them suitable for a particular reuse. The term also includes recyclable material, i.e., products that are capable of being treated or processed to make them suitable for a particular reuse. Any suitable recycled material can be used, such as (but not limited to) tire crumb, compost, tree bark, wood chips, paper, alfalfa, mulch, cotton straw, wheat straw, plastic, polyvinyl chloride, polyethylene, polypropylene, acrylonitrile butadiene styrene, polystyrene, polyethylene terephthalate, nylon, poly carbonate, acrylic fibers, rayon fibers, wood, and other materials.

"Sustainable materials" refers to a material that is derived from a renewable resource or a blend of a first material that is derived from a renewable resource. Suitable sustainable materials can include degradable materials, biodegradable materials, e.g., polylactic acid ("PLA"), polyvinyl alcohol ("PVOH"), polyhydroxyalkanoate ("PHA"), polyhydroxybutyrarte ("PUB"), polycaprolactone ("PCL"), polybutylene succinate ("PBS"), polybutylene succinate adipate ("PBS-A"), aliphatic-aromatic copolyester ("AAC"), and modified polyethylene tetraphthalate ("PET"), and bioplastics and bioplastic blends that can include, for example, PEs, PUs, PAs, polyester, and/or PPs. Additional examples of sustainable materials include compostable materials, for example, materials that comply with the ASTM 6400, EN 13432, and/or International Organization for Standardization ("ISO") 14855 standards, incorporated by reference herein.

In some embodiments, the core layer comprises about 100 weight percent of the one or more buoyant materials, based on the total weight of the core layer.

In some embodiments, the core layer comprises about 50-99 weight percent buoyant material, based on the total weight of the core layer.

In some embodiments, the accessory is flexible.

In some embodiments, the core layer has a diameter of about 0.1-1 inches.

In some embodiments, the one or more buoyant materials are encapsulated within tubing within the core layer.

In some embodiments, the tubing is constructed from rubber, PVC, nylon, vinyl, polyethylene, recycled, sustainable materials or combinations thereof.

In some embodiments, the exterior layer is selected from leather, artificial leather, fabric, synthetic resin, silicon, polymeric material, or combinations thereof.

In some embodiments, the exterior layer is woven together to form an interlocking network of threads.

In some embodiments, the exterior layer has a thickness of about 0.05-1 inches.

In some embodiments, the pet accessory is configured as a leash defined by a handle end and an attachment end with a length therebetween, wherein the attachment end includes a clasp that releasably joins the leash to a second object.

In some embodiments, the leash includes a casing defined by an interior compartment that houses a buoyant material, wherein the casing is positioned adjacent to the clasp.

In some embodiments, the pet accessory is configured as a collar defined by a first end, a second end, a closure that joins the two ends to form a loop, and a casing defined by an interior compartment that houses a buoyant material positioned adjacent to the closure.

In some embodiments, the exterior layer is wrapped or secured around the core layer.

In some embodiments, the presently disclosed subject matter is directed to a method of retaining a pet accessory when the accessory is immersed in a fluid. The term "fluid" broadly refers to any suitable liquid, such as a lake, pond, ocean, river, stream, pool, or any other waterway or source of water. Specifically, the method comprises providing the disclosed pet accessory, exposing the pet accessory to a fluid, wherein the pet accessory floats in the fluid, and retaining the pet accessory from the fluid.

DETAILED DESCRIPTION

Figure 1A:
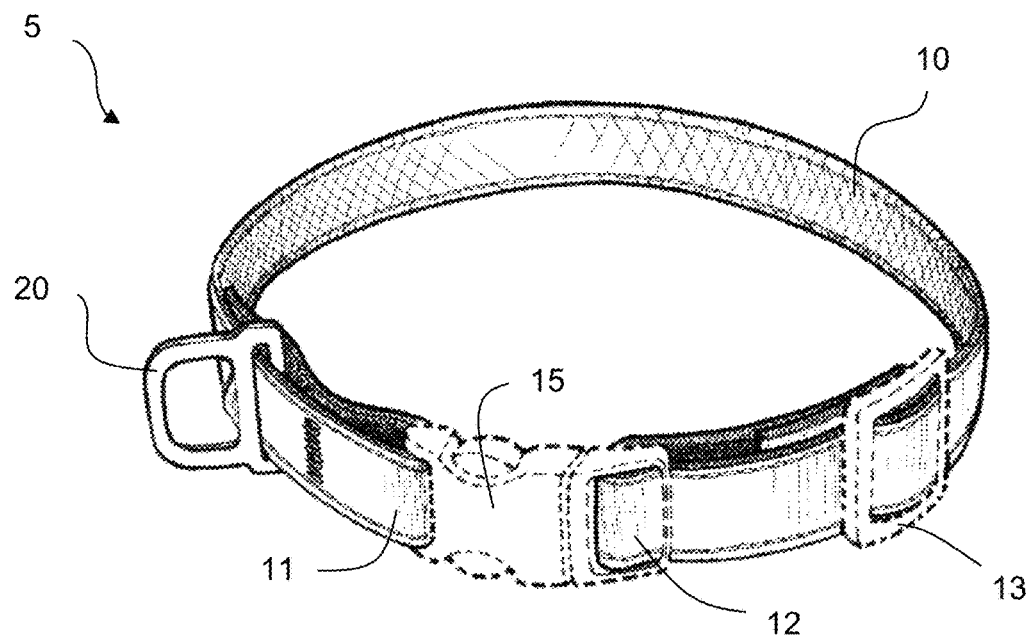
FIG. 1a is a perspective view of a pet collar in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is directed to a pet collar, leash, and/or other accessory that is both waterproof and buoyant. The term "pet" broadly includes any animal used for companionship and/or as a working animal, such as (but not limited to) a dog, cat, rabbit, goat, gerbil, hamster, turtle, lizard, *iguana*, bird, ferret, chinchilla, rat, mouse, guinea pig, horse, pig, donkey, sheep, alpaca, buffalo, emu, camel, llama, and yak. Any animal (e.g., non-human living thing) can be included under the term "pet."

The term "waterproof" refers to a layer or layered structure through which liquid cannot pass in the absence of pressure. In some embodiments, a waterproof item remains relatively or fully unaffected by water, such as resisting the ingress of water under specified conditions (e.g., wet conditions or underwater). A waterproof material may be deemed "waterproof" in accordance with ASTM D3393-91 ("Standard Specification for Coated Fabrics-Waterproofness"), incorporated by reference herein. The standard is intended to establish a recognized criterion for waterproofness in terms of a minimum hydrostatic resistance. A coated material to be tested is placed in a machine that will apply and release a water pressure of 207 kiloPascal (kPa), plus or minus 7.0 kPa (equivalent to 30 pounds per square inch (psi) plus or minus 1.0 psi) four times within one minute, followed by maintaining a pressure at 207 kPa, plus or minus 7.0 kPa for 60 seconds (plus or minus five seconds). The coated fabric fails the test if the tester observes any penetration of water through the fabric while the fabric specimen is under pressure.

Another known method of measuring the relative waterproofness ("waterproof rating") is to measure the height in millimeters of a column of liquid water, having a cross-section of one inch squared and placed above and against the material to be tested, that will be sufficient to cause leaking of water through the material (referred to as the "static column test.") The height of the column in millimeters corresponds to the static pressure of the water against the material and measures the imbalance of force on the material that would tend to drive the water through the material. 704 millimeters corresponds to one pound per square inch (psi) or 68.95 mBar. (One Bar is defined as 100,000 Pascals, equivalent to 14.5038 pounds per square inch (psi) absolute or 0.987 standard atmospheric pressure (atm).) A waterproof rating between 0-5,000 millimeters (0-7.1 psi or 0-489.7 mBar) gives resistance to leaking ranging from no resistance to some resistance to moisture. Ratings over 5,000 millimeters (7.1 psi) to 10,000 millimeters (14.2 psi or 979.4 mBar) are considered rainproof and waterproof under light pressure. Higher ratings give more resistance to greater pressures.

The term "buoyant" refers to the quality of being capable of floating. Thus, buoyancy can be defined as an upward thrust exerted by a fluid that opposes the weight of a partially or fully immersed object. For example, a buoyant material can have a neutral or positive buoyancy with respect to a suspending medium (e.g., water) such that the material has a lower density than the suspending medium and do not settle in the direction of gravity. Neutral buoyancy occurs when the average density of an object is equal to the density of the fluid in which it is immersed, resulting in the buoyant force balancing the force of gravity that would otherwise cause the object to sink (if the density of the object is greater than the density of the fluid) or rise (if the density of the object is less than the density of the fluid). An object that has neutral buoyancy will neither sink nor rise. Positive buoyancy occurs when an object is lighter than the fluid it displaces (e.g., the object will float because the buoyant force is greater than the object's weight).

Advantageously, the disclosed products include a core layer comprising a buoyant material (such as polypropylene) that allow the products to float when at least partially immersed in water (e.g., about 1-100% immersed, such as at least/no more than about 1, 5, 10, 15, 20, 25, 30, 35, 40, 45, 50, 55, 60, 65, 70, 75, 80, 85, 90, 95, 99, or 100% immersed). As a result, the product can be easily retained when inadvertently dropped in a body of water. The products provide the additional advantage of helping a pet remain buoyant when swimming while the collar and/or leash are attached.

The disclosed waterproof and buoyant product can include any pet accessory, such as (but not limited to) a collar, leash, food bowl, toys, harnesses, vests, clothing, water bowls, beds, bedding, and the like. Thus, the disclosed pet accessory can include collar 5, as illustrated in FIG. 1*a*. The term "collar" refers to any of the wide variety of devices that attach around the neck of an animal for control, identification, or other purposes. As shown, a typical collar includes main body 10 that attaches together at ends 11, 12 to form a loop sized to fit around an animal's neck. The length of the main body can be lengthened or shortened via optional slider 13. The collar includes closure 15, which can include a snap fit closure, VELCRO®, magnets, clips, or any other releasable element that allows ends 11 and 12 to attach and separate on demand. The collar can include ring 20 that provides an attachment for a leash, as discussed below.

Figure 1B:
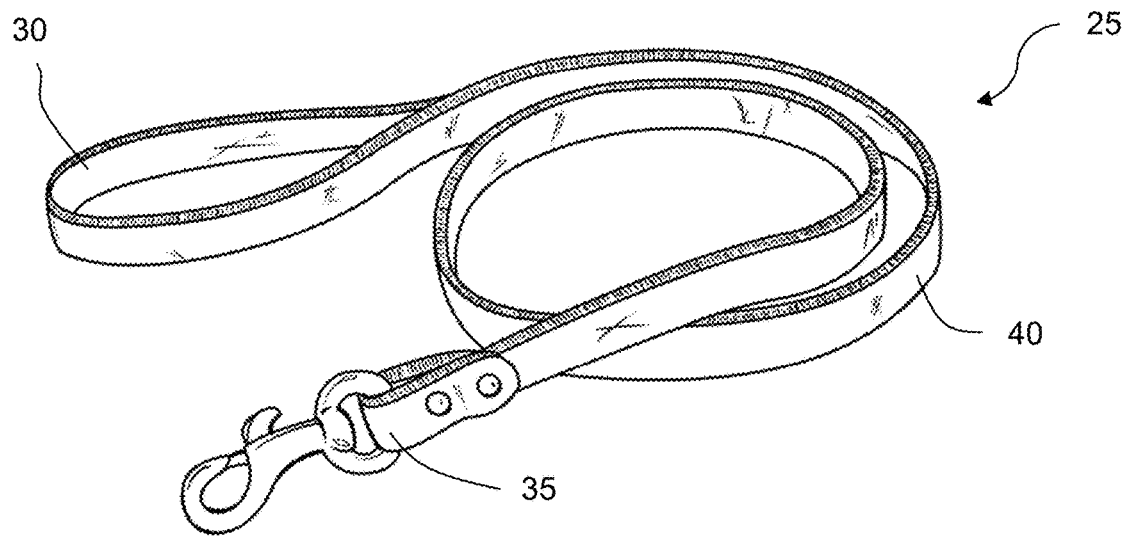
FIG. 1b is a perspective view of a pet leash in accordance with some embodiments of the presently disclosed subject matter.

In some embodiments, the disclosed pet accessory can include pet leash 25, as illustrated in FIG. 1*b*. A typical leash includes handle end 30 and opposed attachment end 35 that can include a clasp or other element that allows the leash to connect with the collar. In some embodiments, the leash can include a retractable loop that fits over the pet's head and neck such that a collar is not needed. The leash further includes length 40 that can be customized depending on the size of the dog, amount of control the owner wishes to keep, and the like.

Figure 1C:
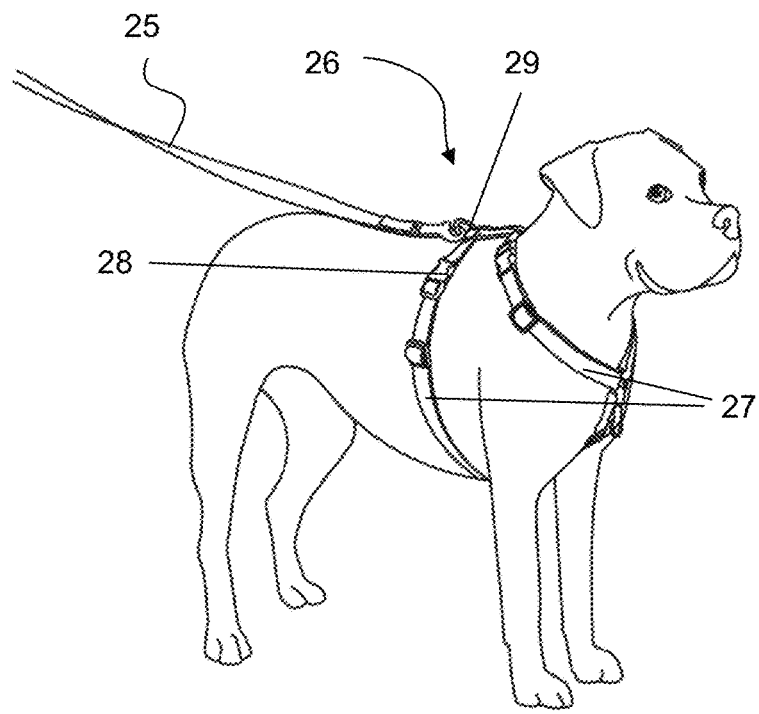
FIG. 1c is a front plan view of a pet harness in accordance with some embodiments of the presently disclosed subject matter.

In some embodiments, the disclosed pet accessory can include harness 26, as illustrated in FIG. 1*c*. As shown, the harness includes one or more straps 27 that surround the dog's torso and/or neck region. The harness can be used to guide, hold, and lift the dog. The harness can include closure(s) 28 or can fit over/around the dog's head and body. The harness can include attachment 29 that allows for cooperation with leash 25.

It should be appreciated that the disclosed pet accessory is not limited to a collar, harness, and leash, but can include any suitable accessory, such as floatation vests, clothing, and the like.

Figure 2A:
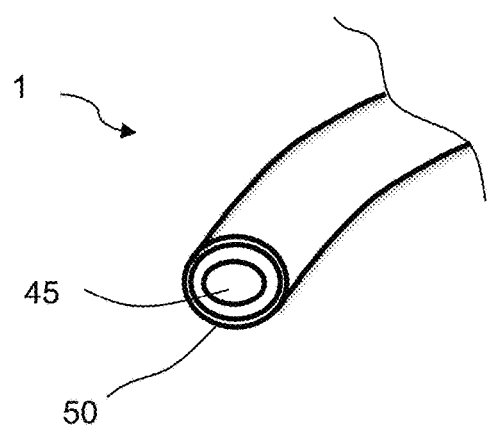
FIG. 2a is a perspective view of a device with an interior core layer and an exterior layer in accordance with some embodiments of the presently disclosed subject matter.
Figure 2B:
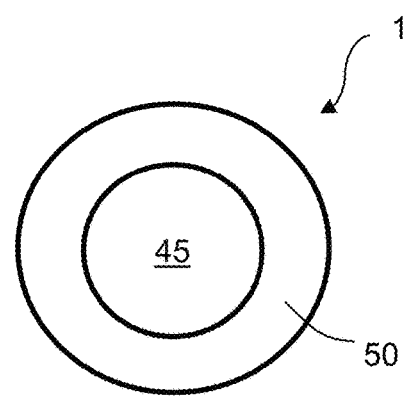
FIG. 2b is a cross-sectional view of a device with an interior core layer and an external layer in accordance with some embodiments of the presently disclosed subject matter.
Figure 2C:
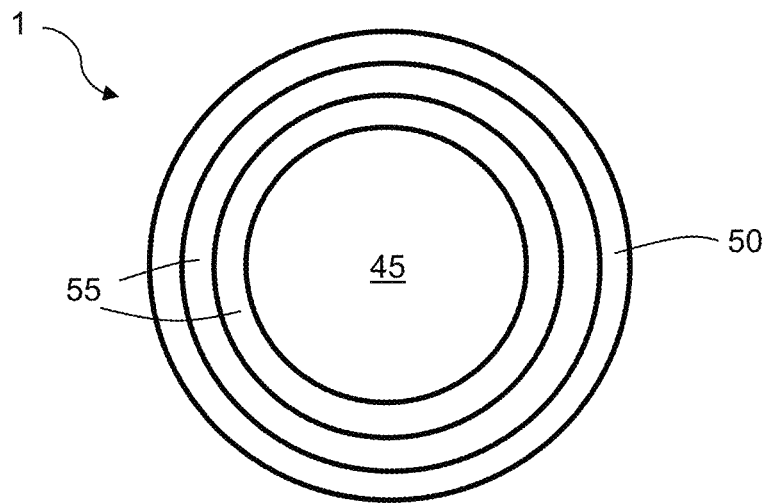
FIG. 2c is a cross-sectional view of a device with an interior core layer, an exterior layer, and a plurality of intermediate layers in accordance with some embodiments of the presently disclosed subject matter.

FIGS. 2*a* and 2*b* illustrate one embodiment of pet accessory 1 comprising core layer 45 and exterior layer 50. The term "core layer" refers to the central layer or layers of a multilayered device or film. The term "exterior layer" refers to the layer comprising the outermost surface of an item or film. As shown, the core layer is positioned within the interior of the device, while the exterior layer surrounds the core layer. One or more optional intermediate layers 55 can also be provided between the core and exterior layers, as shown in FIG. 2*c*. The term "intermediate layer" refers to a layer positioned between the core and exterior layer or between two other layers. The accessory can include any number of intermediate layers, such as about 1, 2, 3, 4, 5, 6, 7, 8, 9, 10, or more.

The core layer functions to provide stability to the device, as well as giving the device the characteristic of being buoyant. Exterior layer 15 provides protection to avoid damage to the core layer, as well as includes abrasion-resistance to avoid damage during everyday use. The intermediate layers can provide optional additional qualities, such as (but not limited to) moisture barrier properties, filler, adhesive layers, and the like. The core layer and/or exterior layer can further provide a waterproof characteristic to the device.

Core layer 45 can include any buoyant material, such as (but are not limited to) one or more of polypropylene, cork, foam, air, rubber, gel, low density urethane, and the like. The term "polypropylene" refers to a thermoplastic polymer produced via polymerization of the monomer propylene, having the chemical formula $(C_3H_6)_n$. The term "cork" refers to the phellem layer of bark tissue that includes suberin from *Quercus suber* (the cork oak), for example. The term "foam" refers to a dispersion in which a large amount of gas is dispersed in a liquid, solid, or gel in the form of gas bubbles (by volume). Suitable foams can include any foam that can be positioned in core layer 45, such as polyurethane foam, polyimide foam, silicone foam, polypropylene foam, imide foam, polymethacrylate foam, and the like. The term "air" includes ambient air or any suitable gas or mixture of gases. The term "rubber" refers to any composition comprising at least one elastomer. The rubber can include natural rubber, synthetic rubber (e.g., neoprene), or combinations thereof. The term gel refers to any of a wide variety of semi-solid materials (e.g., dyneema and spectra).

The core layer can comprise about 100 weight percent buoyant material. In other embodiments, core layer 45 can comprise about 99-50 weight percent buoyant material (e.g., at least/no more than about 99, 95, 90, 85, 80, 75, 70, 65, 60, 55, or 50 weight percent buoyant material(s)).

In some embodiments, core 45 can be flexible (e.g., easily bent or flexed). In this way, the device can be easily formed into a circular collar or used as a leash without breaking or incurring damage. Thus, the flexible nature of core layer 45 allows the device to be hung and easily folded during storage.

Figure 3A:
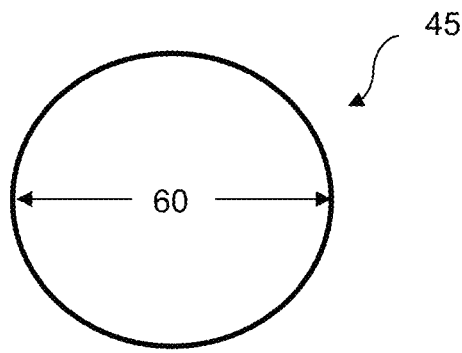
FIG. 3a is a cross-sectional view of a device core layer in accordance with some embodiments of the presently disclosed subject matter.

The core layer can have any suitable diameter. The term "diameter" refers to the longest straight-line distance passing from one side of the core layer to an opposing side and passing through the core layer center. As shown in FIG. 3a, core diameter 60 can be about 0.1-1 inches (at least/no more than about 0.1, 0.2, 0.3, 0.4, 0.5, 0.6, 0.7, 0.8, 0.9, or 1 inch). However, it should be appreciated that the diameter of the core layer can be greater or less than the range given above. The core layer can further have any cross-sectional shape, such as square, rectangular, oval, triangular, circular, and the like.

Figure 3B:
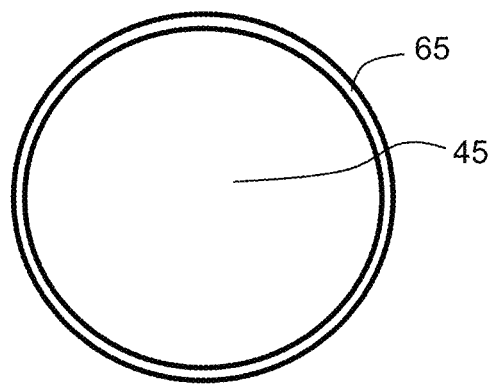
FIGS. 3b and 3c are cross-sectional views of a core layer surrounded by tubing in accordance with some embodiments of the presently disclosed subject matter.
Figure 3C:
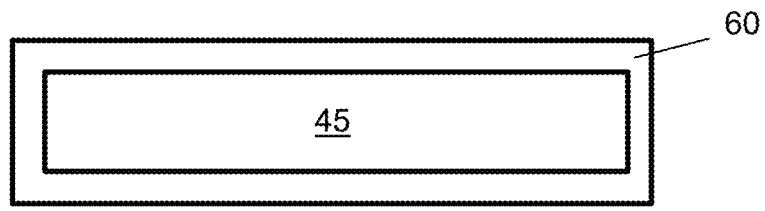

In some embodiments, the core layer can be encapsulated within tubing 65, as illustrated in FIGS. 3b and 3c. The tubing can include any thin, flexible material such as rubber, PVC plastic, nylon, vinyl, polyethylene, and the like. The tubing can function to protect the core layer, providing an additional separation when device 5 is immersed in a body of water. In some embodiments, the tubing is waterproof and/or configured as a coating. The tubing may be of various diameters, such as from 0.01 inches to 1.5 inches in diameter.

The core layer can be configured in any desired shape, such as circular, oval, square, rectangular, triangular, pentagonal, hexagonal, octagonal, and the like. It should be appreciated that any desired shape can be used.

As noted above, the disclosed accessory further includes an exterior layer surrounding core layer 45. Exterior layer 50 can include any durable material, such as (but not limited to) leather, artificial leather (e.g., silicone leather), fabric (e.g., cotton, regenerated cellulose, wool, nylon, and the like), synthetic resin, silicon, polymeric material, recycled material, sustainable materials, or combinations thereof. In some embodiments, the material(s) used in the exterior layer are waterproof, buoyant, or both.

Figure 4A:
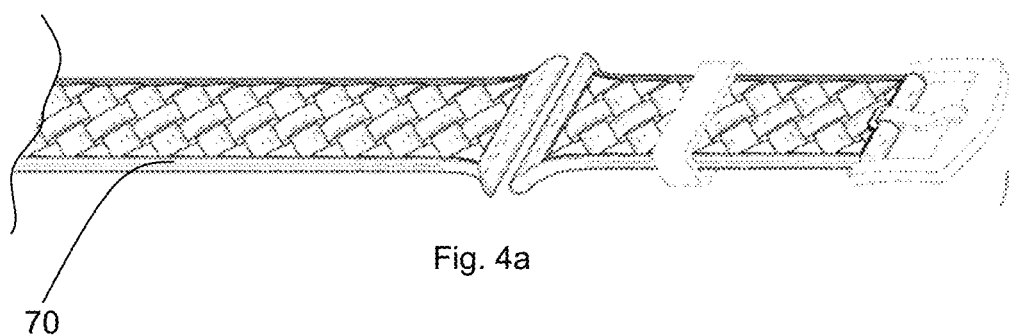
FIG. 4a is a perspective view of a leash with a woven exterior layer in accordance with some embodiments of the presently disclosed subject matter.
Figure 4B:
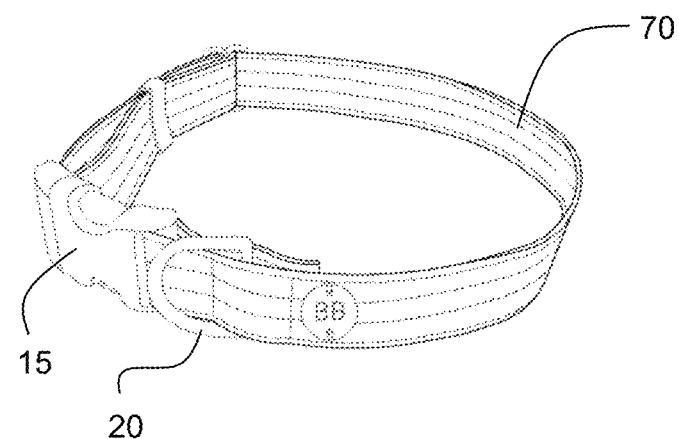
FIG. 4b is a perspective view of a collar with a woven exterior layer in accordance with some embodiments of the presently disclosed subject matter.

In some embodiments, the materials used in exterior layer 50 can be woven together to form an interlocking network of threads 70, as shown in the leash of FIG. 4a and the collar of FIG. 4b.

Figure 4C:
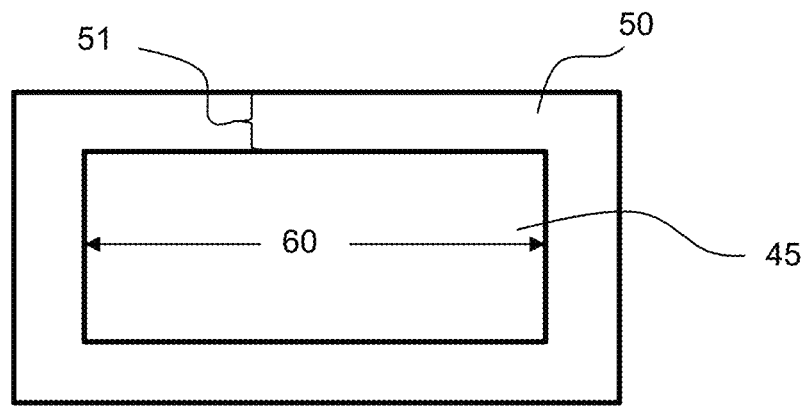
FIG. 4c is a cross-sectional view of a device with an exterior layer and a core layer in accordance with some embodiments of the presently disclosed subject matter.

Exterior layer 50 can include any suitable thickness. For example, the exterior layer can have thickness 51 of about 0.05-1 inches (e.g., at least/no more than about 0.05, 0.1, 0.2, 0.3, 0.4, 0.5, 0.6, 0.7, 0.8, 0.9, or 1 inch), as shown in FIG. 4c. However, the thickness is not limited, and the exterior layer can have a thickness that is greater or less than the given range.

The exterior layer can be configured in any desired color or combination of colors (e.g., red, black, blue, yellow, etc.). The exterior layer can also include any type of pattern, such as stripes, dots, herringbone, checkerboard, and the like. Further, the exterior layer can include printing, such as pet names, school or sports team names and logos, and the like.

As set forth above, device 1 can optionally include one or more intermediate layers 55. For example, the device can include 1-10 or more intermediate layers. The intermediate layers can be constructed from any suitable material or combination of materials and provide a desired characteristic or characteristics to the device. For example, the intermediate layers can provide an oxygen barrier feature, UV protection, abuse resistance, adhesion, and the like. Suitable materials that can be positioned in the intermediate layer(s) are those materials that are included in the core and/or exterior layers in some embodiments. In other embodiments, the core layer can include one or more materials selected from ethylene vinyl alcohol, polyamide, polyvinyl chloride, PVDC, or combinations thereof.

Optional interior layers 55 can include any suitable thickness. For example, an interior layer can have thickness of about 0.01-1 inches (e.g., at least/no more than about 0.01, 0.05, 0.1, 0.2, 0.3, 0.4, 0.5, 0.6, 0.7, 0.8, 0.9, or 1 inch). However, the thickness of intermediate layers 55 is not limited to the given range.

Figure 5A:
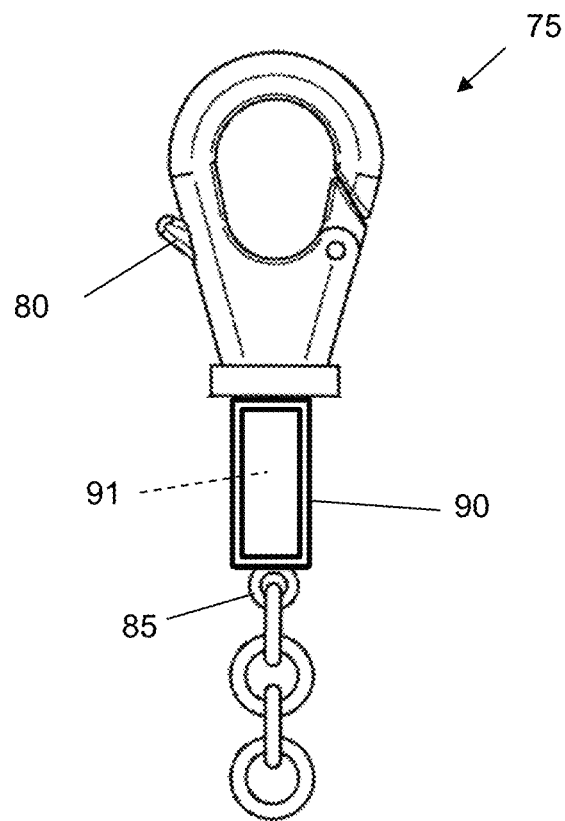
FIG. 5a is a perspective view of a clasp in accordance with some embodiments of the presently disclosed subject matter.

In some embodiments, device 1 can include one or more clasps 75 that allow for attachment (e.g., a leash can be attached to a collar). The term "clasp" includes any of a wide variety of fasteners, clips, locks, or other type of fastener that releasably joins two objects together. One embodiment of clasp 75 is illustrated in FIG. 5a, although any design can be used. For example, the clasp can include slidable arm 80 that allows the clasp to open and close for attachment to a collar or other accessory. The clasp can also include attachment 85 that allows the clasp to be retained on one end of a device (e.g., a leash). For example, a leash can be sewn or otherwise retained to secure the attachment and prevent the clasp from being separated from the leash. It should be appreciated that the clasp can have any suitable design and is not limited to the design of FIG. 5a.

Clasp 75 can be constructed from any rigid material, such as (but not limited to) metal (e.g., steel, stainless steel, copper, aluminum), recycled metal, recycled materials, recycled plastic, plastic, wood, and the like.

Figure 5B:
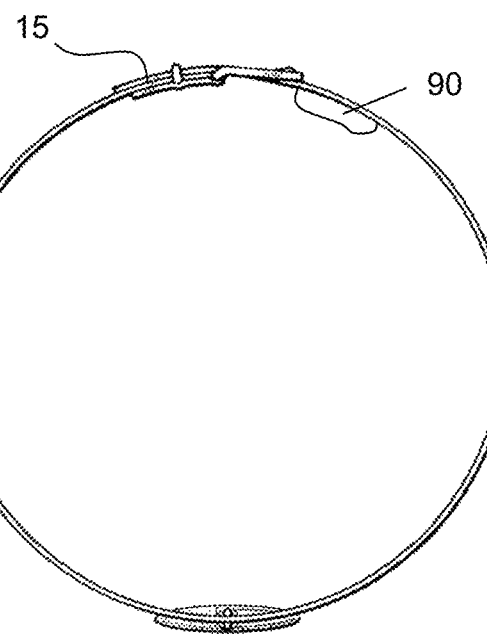
FIG. 5b is a top plan view of a collar with a buoyant casing in accordance with some embodiments of the presently disclosed subject matter.
Figure 5C:
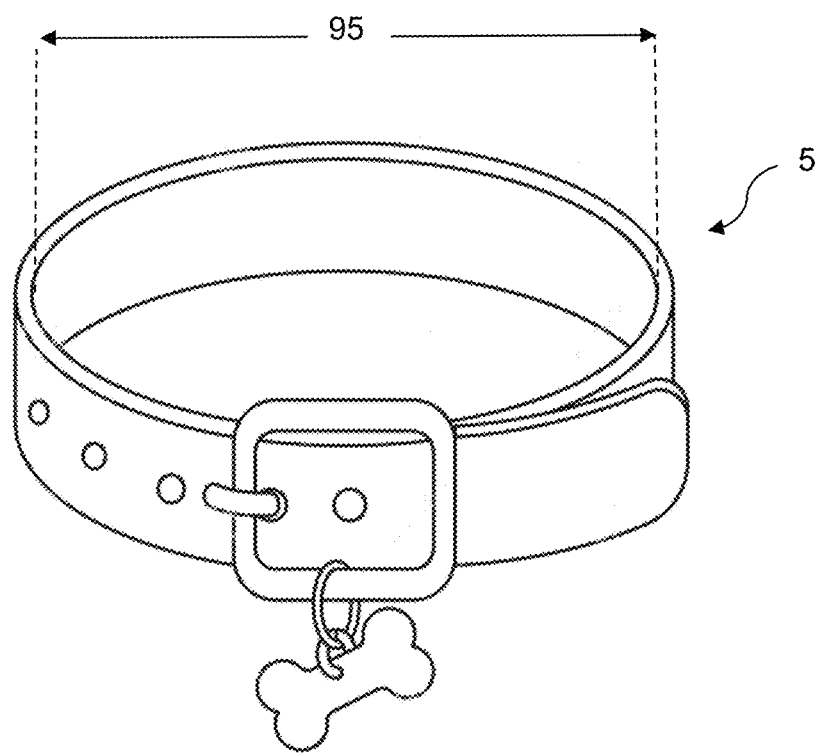
FIG. 5c is a perspective view of a collar in accordance with some embodiments of the presently disclosed subject matter.

In some embodiments, the device can include casing 90 positioned adjacent to the clasp. The casing includes an interior compartment 91 that houses one or more buoyant materials. In this way, the casing functions to displace the weight of clasp 75, further enabling the device to float when exposed to water. Thus, the casing can include one or more buoyant materials that offset the weight of the clasp or collar closure (as shown in FIG. 5c).

When constructing device 1, the exterior layer can be wrapped or otherwise retained around the core layer (or the intermediate layers) using any suitable mechanism. For example, sewing, adhesive, thermoforming, and the like can be used. In some embodiments, a marine grade adhesive can be used to retain the exterior layer around the core. In some embodiments, the exterior layer can be woven around core layer 10. The term "woven" refers to any material that comprises a plurality of strands, wherein the strands are interlaced to form a net, mesh, or screen.

As noted above, the disclosed device can be configured as any of a variety of pet accessories. For example, the device can include dog collar 5, as illustrated in FIG. 5*b*. The collar can have diameter 95 of about 20-75 cm (e.g., at least/no more than about 20, 25, 30, 35, 40, 45, 50, 55, 60, 65, 70, or 75 cm), as shown in FIG. 5*c*. However, the collar can be configured with a larger or smaller diameter than the given range.

Figure 6A:
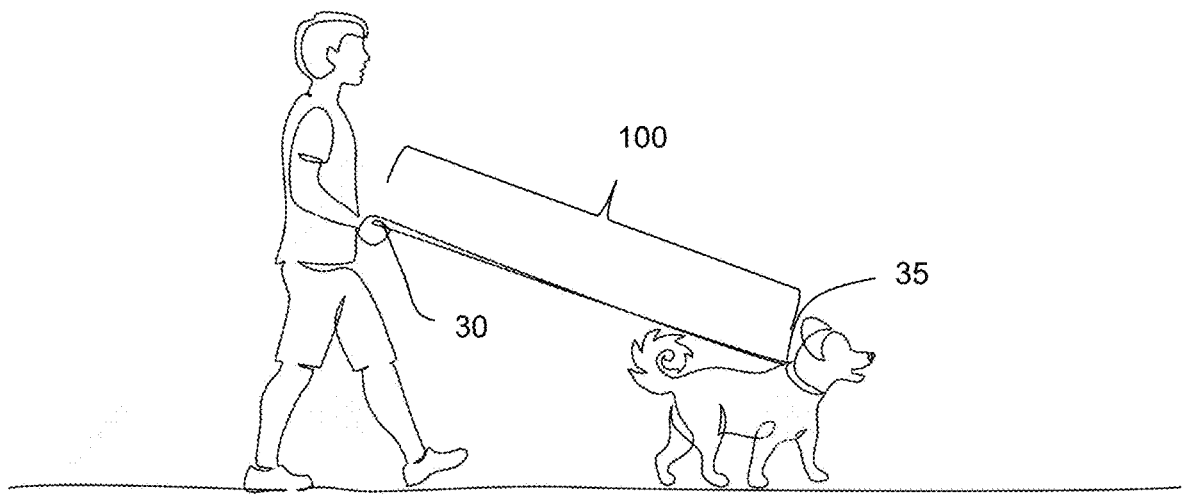
FIG. 6a is a side plan view of a dog leash in use in accordance with some embodiments of the presently disclosed subject matter.
Figure 6B:
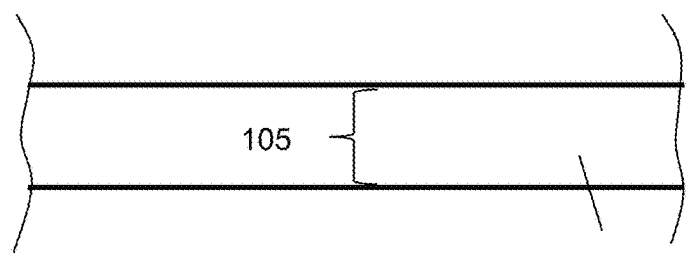
FIG. 6b is a cropped top plan view of a dog leash in accordance with some embodiments of the presently disclosed subject matter.

As also noted above, the disclosed device can be configured as a leash in some embodiments. The leash can have any desired length, such as about 20-50 inches from handle end 30 to attachment end 35, as shown in FIG. 6*a*. Thus, the leash can have length 100 of at least about (or no more than about) 20, 25, 30, 35, 40, 45, or 50 inches. The leash can further include width 105 of about 0.5-3 inches (at least/no more than about 0.5, 1, 1.5, 2, 2.5, or 3 inches), as shown in FIG. 6*b*. It should be appreciated that the leash length and width is not limited.

In use, the disclosed collar 5 can be affixed around an animal's neck (e.g., a dog's neck), as would be conventionally known. Once the collar is properly fitted, a leash may be coupled to the collar by attaching leash clasp 75 to collar ring 20. The dog may then be walked and controlled through the combination of the leash and collar. If the dog jumps into a body of water (e.g., the ocean) or the leash/collar are inadvertently dropped into the water, the leash and collar are buoyant and therefore can be easily grasped and located by the owner. Specifically, buoyant core 45 allows the device to float so that they can be accessed on the top of the water. When present, casing 90 offsets the clasp or other weighted hardware which further helps with floatation of the device. In addition, when the dog is wearing the collar and/or is connected to the leash, the items provide a buoyant characteristic which can aid in swimming.

When the walk is over, the leash can be disconnected from the collar and the collar optionally removed from the dog. The leash and/or collar can then be stored until needed again.

The presently disclosed subject matter offers many advantages over prior art leashes, collars, and other pet accessories. For example, the disclosed accessory is buoyant, preventing or reducing the likelihood of loss if dropped in a body of water.

The device is resilient and can be reused for many years without requiring replacement.

The disclosed accessory allows for unrestricted, comfortable, and fully supported water activities, as well as freedom to walk or run on land.

The device can be used with any sized pet, from small dogs to large breeds. In addition, the device is not limited to use with dogs and can be used with any suitable animal (e.g., cats, pigs, domesticated animals, and the like).

Furthermore, the disclosed pet accessories are easy to use, such that even children or the elderly can attach or remove the leash and/or collar.

Exemplary embodiments of the methods and components of the presently disclosed subject matter have been described herein. As noted elsewhere, these embodiments have been described for illustrative purposes only, and are not limiting. Other embodiments are possible and are covered by the presently disclosed subject matter. Such embodiments will be apparent to persons skilled in the relevant art(s) based on the teachings contained herein. Thus, the breadth and scope of the present invention should not be limited by any of the above-described exemplary embodiments but should be defined only in accordance with the following claims and their equivalents.

What is claimed is:

1. A pet accessory comprising:
   an inner core layer comprising one or more buoyant materials based on the total weight of the core layer, wherein the one or more buoyant materials comprises sustainable materials;
   an exterior layer comprising a durable material selected from one or more of polyester, polypropylene, high density polyethylene, high impact polystyrene, styrene block copolymer, polyamide, aliphatic polyamide, polymeric material, polyurethane, cloth, plastic, nylon, metal, cyclic olefin copolymer, leather, artificial leather, fabric, synthetic resin, silicon;
   wherein the pet accessory is buoyant when immersed in a fluid; and
   wherein the sustainable materials are selected from polylactic acid polyvinyl alcohol, polyhydroxyalkanoate, polyhydroxybutyrarte, polycaprolactone, polybutylene succinate, polybutylene succinate adipate, aliphatic-aromatic copolyester, modified polyethylene tetraphthalate, and polyester.

2. The pet accessory of claim 1, configured as a leash, harness, or collar.

3. The pet accessory of claim 1, wherein the pet accessory is 100% waterproof.

4. The pet accessory of claim 1, wherein the buoyant material further comprises recycled materials, wherein the recycled materials are selected from one or more of tire crumb, compost, tree bark, wood chips, paper, alfalfa, mulch, cotton straw, wheat straw, plastic, polyvinyl chloride, polyethylene, polypropylene, acrylonitrile butadiene styrene, polystyrene, polyethylene terephthalate, nylon, poly carbonate, acrylic fibers, rayon fibers, wood.

5. The pet accessory of claim 1, wherein the core layer comprises about 100 weight percent of the one or more buoyant materials, based on the total weight of the core layer.

6. The pet accessory of claim 1, wherein the core layer comprises about 80-99 weight percent buoyant material, based on the total weight of the core layer.

7. The pet accessory of claim 1, wherein the accessory is flexible.

8. The pet accessory of claim 1, wherein the core layer has a diameter of about 0.1-1 inches.

9. The pet accessory of claim 1, wherein the one or more buoyant materials are encapsulated within tubing within the core layer, wherein the tubing comprises rubber, PVC, nylon, vinyl, polyethylene, recycled, sustainable material, or combinations thereof.

10. The pet accessory of claim 1, wherein the exterior layer is woven together to form an interlocking network of threads.

11. The pet accessory of claim 1, wherein the exterior layer has a thickness of about 0.05-1 inches.

12. The pet accessory of claim 1, wherein the exterior layer is wrapped or secured around the core layer.

13. A method of retaining a pet accessory immersed in a fluid, the method comprising:
   exposing the pet accessory of claim 1 to a fluid, wherein the pet accessory floats in the fluid; and
   retaining the pet accessory by removing it from the fluid.

14. The method of claim 13, wherein the fluid is water.

15. The method of claim 13, wherein exposing the fluid to water comprises immersing the pet accessory in the fluid.

\* \* \* \* \*